US010298041B2

(12) United States Patent
Jaoui et al.

(10) Patent No.: US 10,298,041 B2
(45) Date of Patent: May 21, 2019

(54) ELECTRONIC CONNECT/DISCONNECT DEVICE AND METHOD FOR A HIGH VOLTAGE BATTERY

(71) Applicant: SAFT, Bagnolet (FR)

(72) Inventors: Younes Jaoui, Bruges (FR); Jean-Yves Clotes, Bordeaux (FR); Benoit Vasselin, Saint Medard en Jalles (FR); Stephane Monsinjon, Saint Pierre de Mons (FR)

(73) Assignee: SAFT, Bagnolet (FR)

( * ) Notice: Subject to any disclaimer, the term of this patent is extended or adjusted under 35 U.S.C. 154(b) by 0 days.

(21) Appl. No.: 15/270,737

(22) Filed: Sep. 20, 2016

(65) Prior Publication Data

US 2017/0093194 A1 Mar. 30, 2017

(30) Foreign Application Priority Data

Sep. 24, 2015 (FR) ...................................... 15 59005

(51) Int. Cl.
*H02J 7/00* (2006.01)

(52) U.S. Cl.
CPC .......... *H02J 7/0068* (2013.01); *H02J 7/0029* (2013.01); *H02J 7/0031* (2013.01); *H02J 7/0072* (2013.01); *H02J 2007/0039* (2013.01)

(58) Field of Classification Search
CPC .................................................. H02J 7/0068
USPC ....................................................... 320/134
See application file for complete search history.

(56) References Cited

U.S. PATENT DOCUMENTS

| 5,789,900 | A | 8/1998 | Hasegawa et al. | |
|---|---|---|---|---|
| 6,316,915 | B1 * | 11/2001 | Fujiwara | H02J 7/0031 320/134 |
| 8,896,315 | B1 * | 11/2014 | Davies | H02J 7/0019 320/117 |
| 2003/0027036 | A1 * | 2/2003 | Emori | H01M 2/34 429/61 |
| 2005/0275983 | A1 * | 12/2005 | Franklin | B60L 11/1887 361/56 |
| 2007/0210758 | A1 | 9/2007 | Gangstoe et al. | |

(Continued)

FOREIGN PATENT DOCUMENTS

DE 10 2013 222 462 A1 5/2015

OTHER PUBLICATIONS

French Office Action for 1559005 dated Sep. 24, 2015.

*Primary Examiner* — Suchin Parihar
(74) *Attorney, Agent, or Firm* — Sughrue Mion, PLLC

(57) ABSTRACT

An electronic connecting/disconnecting device for a high voltage unit for storing electrical energy designed to be charged and discharged asymmetrically, in particular a battery arranged as part of an electrical circuit is provided. The device includes a charging switch and a discharge switch arranged in parallel and dimensioned asymmetrically for charging and discharging the unit for storing electrical energy, the charging switch being adapted to block, in a first direction of passage, an electric current flowing therethrough, this first direction of passage being opposite to a second direction of passage in which the discharge switch is adapted to block an electric current passing therethrough, the device being able to be activated when a physical magnitude of an electrical current flowing through the circuit is greater than a predetermined threshold.

15 Claims, 3 Drawing Sheets

(56) References Cited

U.S. PATENT DOCUMENTS

| | | | |
|---|---|---|---|
| 2009/0051324 A1* | 2/2009 | Nakatsuji | H01M 10/441 320/134 |
| 2010/0141214 A1* | 6/2010 | Yoon | B60K 6/28 320/134 |
| 2011/0228436 A1* | 9/2011 | Lee | 361/93.7 |
| 2013/0257377 A1* | 10/2013 | Diamond | G01R 31/362 320/118 |
| 2015/0263559 A1 | 9/2015 | Kim | |
| 2015/0270710 A1* | 9/2015 | Carver | H02J 7/0024 307/109 |
| 2015/0365003 A1* | 12/2015 | Sadwick | H02M 3/28 363/21.01 |
| 2016/0118885 A1* | 4/2016 | Abdoulin | H02J 1/00 323/271 |

* cited by examiner

ELECTRONIC CONNECT/DISCONNECT DEVICE AND METHOD FOR A HIGH VOLTAGE BATTERY

BACKGROUND OF THE INVENTION

Field of the Invention

The technical field of the present invention is that of storage units for electrical energy. More particularly, the present invention concerns an electronic connect/disconnect device for a high voltage electrochemical storage battery designed to be charged and discharged asymmetrically. By high voltage, we mean a voltage greater than or equal to 250 volts.

An electrochemical cell is a power generation device in which chemical energy is converted into electrical energy. The chemical energy originates through electrochemically active compounds deposited on at least one side of electrodes arranged in the storage cell. Electrical energy is produced by electrochemical reactions during discharge of the storage cell. Electrodes, arranged in a container, are electrically connected to current output terminals to provide electrical continuity between the electrodes and an electrical power consuming circuit or load with which the battery is associated.

To increase power output, it is known to associate sealed secondary cells together to form a battery. The battery then has one or more parallel branches of secondary cells connected in series.

Description of Background Art

In the prior art, to protect the output a high-voltage battery from excessive currents and for detecting short-circuit currents, two bidirectional static switches connected back to back in series are often used. This solution is appropriate for low voltage batteries, for example up to 48V, for powers of several tens of kW. However, in the prior art, it was not possible to ensure overlap between charging and discharging for applications with a high output voltage and with high currents.

For this, the use of switches that are bidirectional in terms of voltage arranged in parallel is more suitable for high voltage and high current battery applications for powers of several tens of kW. However, this type of device does not make it possible to obtain rapid and precise measurement and/or control of surge or inrush and short-circuit currents in a high-voltage battery.

There is known for example from DE 10 2013 222462 a device in which two high voltage switches, comprising diodes in series, are arranged in parallel, but this does not allow asymmetric use, with fault currents that can be very high in the discharge direction and with low currents in the charging direction.

To solve this problem, in the above patent application, an external limitation branch is added including a resistor, but this increases the size and cost of the device.

Devices such as those disclosed in US 2007/210758 or US 2015/263559, in which the charging and discharging circuits are arranged in series are known, but these do not make it possible to optimize the charging branch with respect to the discharge branch.

There is therefore a real need for an electronic device capable of quickly and precisely measuring and controlling surge or inrush and short-circuit currents in a high voltage battery taking into account its mode of operation.

SUMMARY OF THE INVENTION

To this end, the present invention provides an electronic connecting/disconnecting device for high voltage unit for storing electrical energy designed to be charged and discharged asymmetrically, said unit for storing electrical energy being arranged within an electrical circuit, said device comprising a charging switch and a discharge switch arranged in parallel and dimensioned asymmetrically for charging and discharging said unit for storing electrical energy, said charging switch being adapted to block, in a first direction of passage, an electric current flowing therethrough, said first direction of passage being opposite to a second direction of passage in which said discharge switch is adapted to block an electric current passing therethrough, said device being designed to be activated when a physical magnitude of an electrical current flowing through said circuit is greater than a predetermined threshold.

Thanks to these arrangements, overlap of operating modes in charging and discharge modes of a unit for storing electrical energy at high voltage is achieved. In other words, the electronic device according to the invention allows an unlimited number of successive cycles of operation of such a unit for storing electrical energy, each of said cycles comprising a charge and discharge.

The invention relates in particular to electric storage batteries, but also relates to power converters and the DC generators.

According to an embodiment of the electronic device,
the discharge switch is designed to manage short-circuit currents in said electrical circuit, and
the discharge switch and the charging switch are adapted to manage surge currents in said electrical circuit.

Thanks to these arrangements, risks arising from delayed detection and non-detection of a short-circuit current if the threshold for detection of such a short-circuit current is lower than a surge current are reduced to a minimum. Typically, the order of magnitude of current that a fault current can reach is 8000 amperes for one branch, a battery being constituted by several branches in parallel, when a circuit breaking device is used.

According to another embodiment of this electronic device, each switch includes a power diode and a power transistor arranged in series.

A freewheeling diode, such as that indicated with reference to FIG. 2, may be mounted in parallel with the load and directly as close as possible to the electronic circuit.

According to a further embodiment of the electronic device,
the power diode is of the bipolar, Schottky or SiC type, and
the power transistor is of the bipolar, IGBT, MOSFET or JFET type.

Thanks to these provisions, the use of a fuse-type circuit breaker is no longer necessary, which represents a considerable advantage since in the prior art, when the fuse of such a circuit breaker blows, a battery remains unavailable up until the intervention of an operator. According to the invention, a fuse circuit breaker may nevertheless be employed to provide a redundant protective role.

According to yet another embodiment of this electronic device, the charging switch is an electromechanical switch.

According to particular features, this electronic device can further include:
a sensor for measuring the at least one physical magnitude of electric current,
a control unit for comparing the at least one measured physical magnitude with the predetermined threshold, and
a drive circuit for controlling each switch.

Thanks to these provisions, the unit for storing electrical energy is only disconnected when necessary.

According to other particular features of this electronic device, the drive circuit is electrically isolated from the at least one switch which it controls Thanks to these provisions, integrity of the drive circuit is guaranteed.

According to other particular characteristics, the electronic device further comprises at least one current limiter comprising a transistor and a time delay control circuit.

Thanks to these provisions, at least the discharge switch is operated in linear mode for short periods.

The invention also relates to an assembly comprising the above electronic device and a unit for storing electrical energy at high voltage designed to be charged and discharged asymmetrically, said unit for storing electrical energy making up part of an electrical circuit, said unit for storing electrical energy being a battery made up of electrochemical storage cells and the voltage of which is greater than or equal to 250 volts.

The invention also relates to a method for short-circuit current and surge current management in an electrical circuit using the above electronic device wherein said device is activated when a physical magnitude of an electrical current flowing through said circuit is greater than a predetermined threshold.

As the advantages of this method of management are similar to those of the electronic device according to the invention, they are not repeated here.

According to one embodiment of this method,
an activation duration threshold for the electronic device is determined,
the electronic device is de-activated when a duration reaches said duration threshold.

Thanks to these provisions, the risks of overheating the electronic device according to the invention are minimized.

According to another embodiment of this method,
the measured value of the physical magnitude is used to determine a time exceeded threshold,
an elapsed time from the moment when the predetermined threshold is reached by the measured physical magnitude is measured,
said measured elapsed time is compared with said threshold, and
the electronic device is only activated when the measured elapsed time reaches said time exceeded threshold.

Thanks to these provisions, the operating duration of the electronic device is optimized.

According to yet another embodiment, the method includes
determining a temperature threshold,
measuring a temperature near to or within the electrical circuit,
comparing said temperature measured with said temperature threshold, and
only activating the electronic device when said measured temperature exceeds said temperature threshold.

Thanks to these provisions, overheating of the electronic device according to the invention is minimized.

According to further particular features, the method includes the steps of:
determining a maximum duration of current limiter activity,
measuring a duration of activity of said current limiter
comparing said measured duration with said maximum duration, and
deactivating said current limiter when the measured duration reaches said maximum duration.

Thanks to these provisions, the risk of overheating the current limiter according to the invention is minimized.

The invention also relates to a method of manufacturing such an electronic device, comprising:
determining at least one physical magnitude of an electrical current which each switch is designed to pass, and
independently dimensioning each switch according to said physical magnitude of the electric current it is designed to pass.

Thanks to these features, the size, cost and performance of the power components of the electronic device of the invention are optimized, as is the overall cost of manufacturing the electronic device.

BRIEF DESCRIPTION OF THE DRAWINGS

Other characteristics and advantages of the invention will appear on reading the following description of three preferred embodiments of the invention, given by way of example and with reference to the appended drawings, which show.

In the following description, identical elements or identical function carry the same reference sign. For the purposes of conciseness of the present description, elements which are identical in the various examples are not described for each of these examples. In other words, only the differences between the various examples are described in detail, common elements being described with regard to one example.

Furthermore, in the following description, the stated numerical values, though not limitative, have proved in tests as providing the most advantageous results.

DETAILED DESCRIPTION OF PREFERRED EMBODIMENTS

Figure 1:
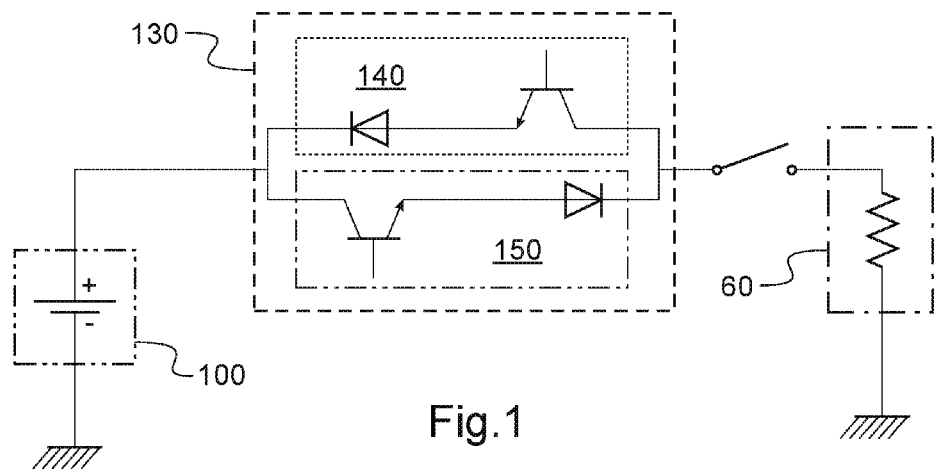
FIG. 1, a diagram showing a first example of the electronic device according to the invention.

FIG. 1 shows a first embodiment of an electronic connect/disconnect device 130 of the invention. The electronic device 130 is arranged within an electrical circuit, between firstly, a unit for storing electrical energy at high voltage 100, here a battery made up of secondary cells and referred to as the battery, and secondly, a current consuming circuit or load 60.

The battery 100 is intended to be charged and discharged asymmetrically, that is to say by using a current for charging which is different to its discharge current. Typically, the charging current is ten times less than the discharge current.

The electronic device 130 includes a charging switch 140 and a discharge switch 150 arranged in parallel, and asymmetrically dimensioned for charging and discharging of the battery 100, that is to say a charging current threshold for charging switch 140 is different to the discharge current threshold for discharge switch 150.

Preferably, the switches 140 and 150 are switches in silicon.

The charging switch 140 is designed to block, in a first direction of passage, an electric current flowing therethrough, said first direction of passage being opposite to a second direction of passage for which discharge switch 150 is designed to block an electric current passing therethrough.

Each switch 140 and 150 includes a power diode and a power transistor arranged in series and is activated when a physical magnitude of electrical current passing therethrough exceeds a predetermined threshold. The role of the diode is, on the one hand, to make the switch into which it is incorporated reversible in voltage and, on the other hand, to block reverse currents.

Typically, the threshold for a discharge current is ten times higher than the charging current threshold because the discharge switch 150 is designed to deal with short circuit currents and surge or inrush current of the electrical circuit while the charging switch 140 is only designed to deal with surge or inrush currents of said electrical circuit.

Preferably, the power diode is of the bipolar, Schottky or SiC type, and the power transistor is a bipolar, IGBT (Insulated Gate Bipolar Transistor), MOSFET (Metal Oxide Semiconductor Field Effect Transistor) or a JFET (Junction Field Effect Transistor) type transistor.

Alternatively, charging switch 140 can be an electromechanical contactor.

Figure 2:
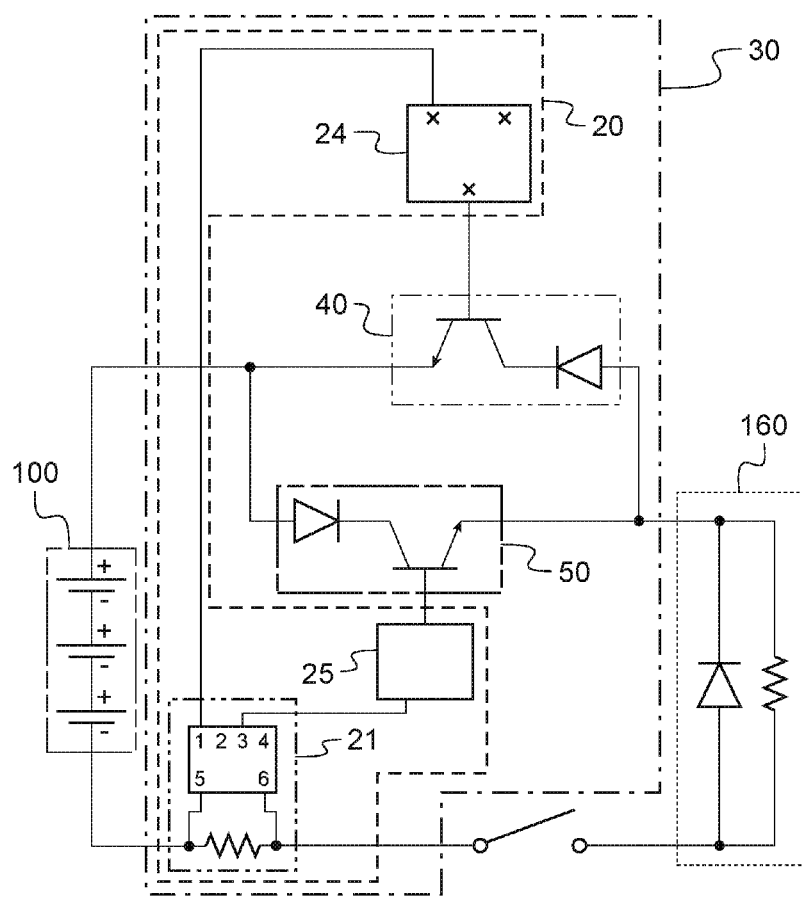
FIG. 2, a diagram showing a second example of the electronic device according to the invention.

FIG. 2 shows a second embodiment of an electronic device 30 according to the invention. The electronic device 30 further comprises, relative to the electronic device 130 of FIG. 1:
- a sensor 21 for measuring a physical magnitude of electric current,
- a control unit 20 for comparing the measured physical magnitude to a predetermined threshold, and
- two drive circuits 24 and 25, each being intended to control charging switch 40 or discharge switch 50, respectively.

Typically, drive circuits 24 and 25 are of a microcontroller, PLD (programmable logic device), FPGA (field-programmable gate array), EPLD (erasable programmable logic device) CPLD (complex programmable logic device), PAL (programmable array logic) or PLA (programmable logic array) type.

Preferably, each drive circuit 24 and 25 is electrically isolated from the switch 40 and 50 it controls. Typically, isolation of the drive circuits is provided by optical fiber. Alternatively, isolation is carried out using isolation transformers.

Preferably, the physical magnitude representing electric current is current strength and is measured at the negative or positive polarity of the battery by means of a tapping and a current sensor, i.e. an ammeter. In this case, the predetermined thresholds are current strength thresholds.

In an alternative embodiment, the physical magnitude representing electrical current is voltage, and this is measured at the negative or positive polarity of the battery using a tapping and a voltmeter. In this case, the predetermined thresholds are voltage thresholds.

Figure 3:
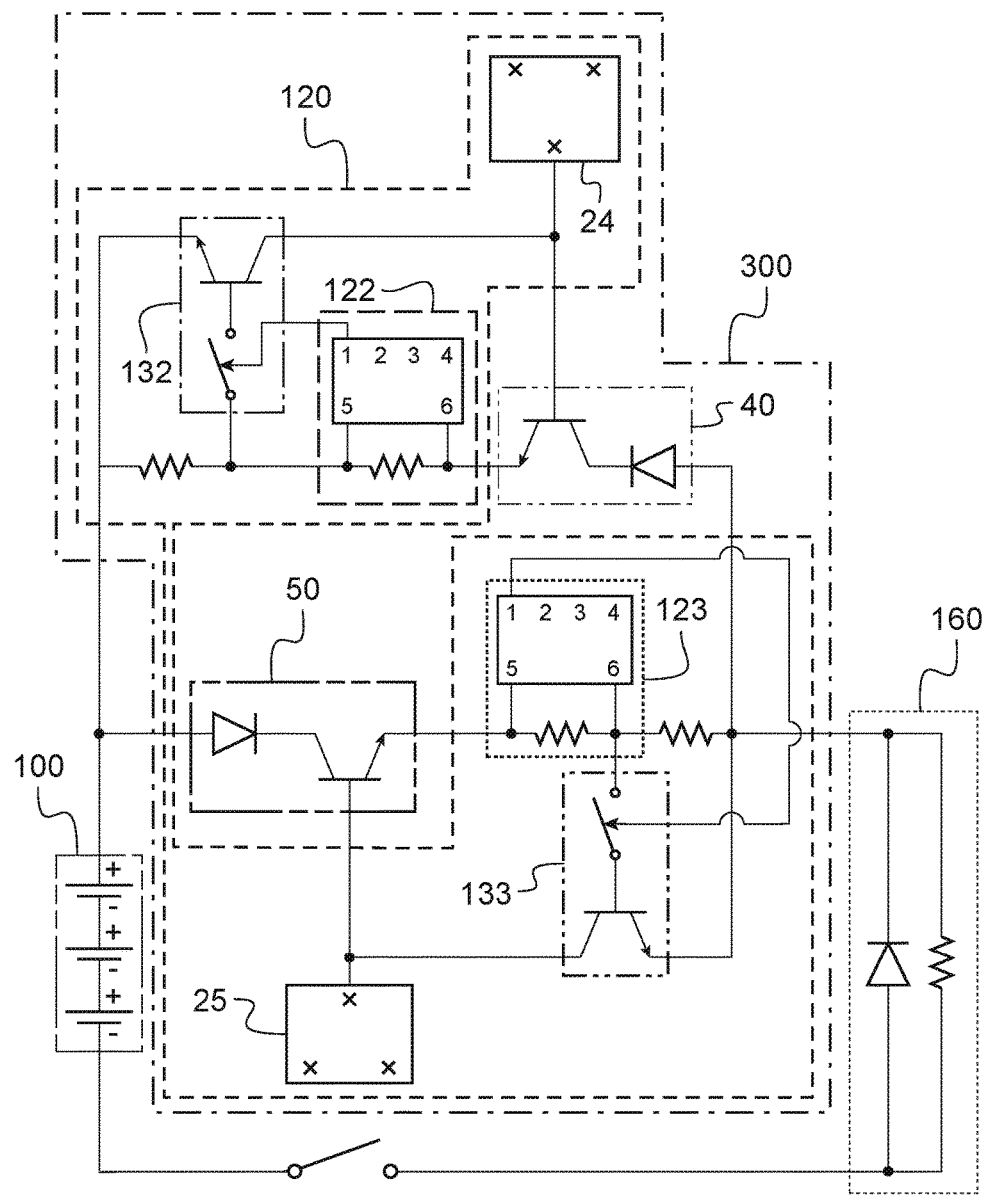
FIG. 3, a diagram showing a third example of the electronic device according to the invention.

FIG. 3 shows a third embodiment of an electronic device 300 according to the invention.

The electronic device 300 further comprises, when compared to the electronic device 130 of FIG. 1:
- two sensors 122 and 123 for measuring the at least one physical magnitude of electric current,
- a control unit 120 for comparing the at least one measured physical magnitude to the predetermined threshold, and
- a drive circuit 24 and 25 for respectively controlling each of charging switch 40 and 50.

The electronic device 300 further comprises, when compared to the electronic device 130 of FIG. 2, at least one, here two, current limiter(s) 132 and 133 comprising a transistor and a time delay control circuit.

The current limiter 132 is associated with the charging switch 40 and the sensor 122 while the current limiter 133 is associated with discharge switch 50 and sensor 123.

When the electronic device according to the invention comprises only a single current limiter, it is associated with the discharge switch 50 and the sensor 123.

The current limiters 132 and 133 perform instantaneous limiting, i.e. clipping, within a few microseconds, of electric current strength.

For example, some applications have an instantaneous limitation of the order of 15 amps for the charging switch and 2,500 amps for discharge switch 50.

The invention also relates to a method of manufacturing an electronic devices 30, 130 or 300 as disclosed above, in which:
- the physical magnitude of the electrical current which each switch 40 and 50 or 140 and 150 is intended to pass is determined, and
- each switch 40 and 50 or 140 and 150 is independently dimensioned in correspondence to said physical magnitude of the electric current it is designed to pass.

The invention further relates to a short-circuit current and surge current management method for an electrical circuit using the electronic device 30, 130 or 300 as described above, in which said device is caused to operate when a physical magnitude of the electrical current flowing through said circuit is greater than a predetermined threshold.

Figure 4:
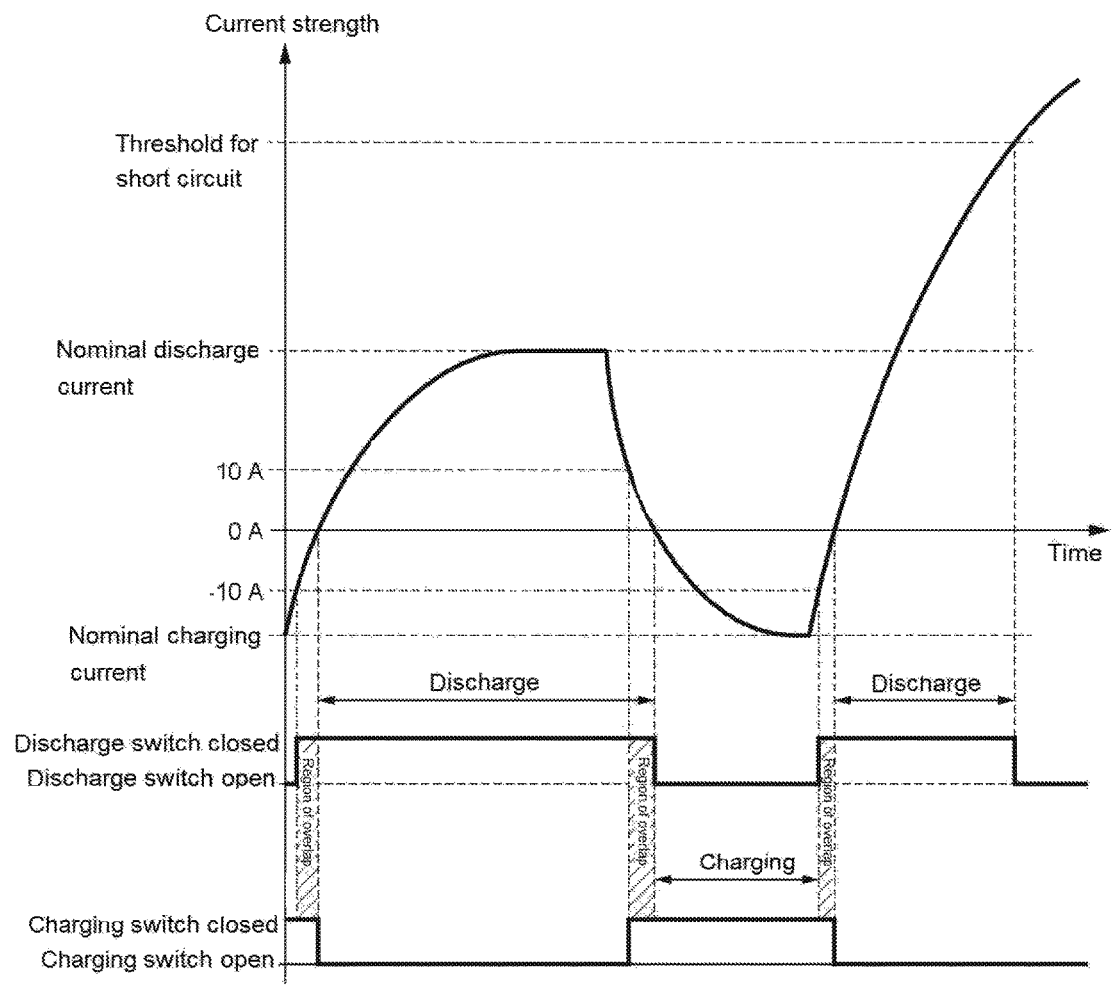
FIG. 4, a graphical representation of an example of how the strength of the current flowing through the electrical circuit into which the electronic device according to the invention is included varies with time.

FIG. 4 shows graphically an example of variation in current passing through an electrical circuit into which one of the electronic devices 30, 130 or 300 as described above is incorporated, as a function of time.

At instant in time 0, the electrical current has a predetermined nominal charging value here less than 10 amps, the charging switch 40 or 140 is closed, i.e. allows electric current to pass and discharge switch 50 or 150 is open, i.e. prevents electrical current from flowing.

In the example, a first cycle begins when the electrical current value reached −10 amperes, discharge switch 50 or 150 closes and, when the electric current strength becomes zero after a period of time here called first overlap, the charging switch 40 or 140 is opened.

The circuit is then in a discharge phase in which the electric current strength reaches a preset nominal discharge value, here more than 10 amperes, which continues until the value falls to +10 amperes. At this point in time, charging switch 40 or 140 is closed and, when the electric current strength becomes zero after a period of time called herein the second overlap period, discharge switch 50 or 150 reopens.

The circuit is now in a charge phase during which the electrical current reaches the predefined nominal charging value which continues until it reaches −10 amps. At this point, a new cycle begins, which, like the first cycle begins by closing of discharge switch 50 or 150.

During this second cycle, when the electric current strength becomes zero after a period of time we call the first overlap period, charging switch 40 or 140 is opened and the electric current strength increases, but unlike the first cycle, does not remain at the predefined discharge value. Indeed, in this second cycle, electric current strength continues to rise until it reaches the current strength threshold which is representative of a short-circuit current.

At this moment, discharge switch 50 or 150 reopens and charging switch 40 or 140 remains open.

To further reduce the risk of overheating of the electrical circuit in which an electronic devices 130 or 300 as described above is arranged, several provisions, we shall call variants are implemented and detailed below.

In a first variant, a threshold of the duration of activation of one of the electronic devices 130 or 300 as described above is determined and the electronic device is deactivated when the duration reaches said threshold duration.

In a second variant,
a threshold value for the time during which a value can be exceeded is determined as a function of the measured value of the physical magnitude,
the elapsed time from the moment when the said determined threshold is reached by the measured physical magnitude is measured,
the measured elapsed time is compared with said threshold value of the time during which the value can be exceeded, and
the electronic device is only activated when the measured period of elapsed time reaches said threshold.

In a third variant,
a temperature threshold is determined
a temperature close to or within the electrical circuit is measured,
said temperature measured is compared with said temperature threshold, and
the electronic device is only activated when said measured temperature exceeds said temperature threshold.

In a fourth variant, which concerns electronic device 300 of FIG. 3 only,
a maximum duration of activity of current limiters 132 and 133 is determined,
a duration of activity of said current limiters is measured,
said measured duration is compared to said maximum duration, and
one and/or the other of said current limiters 132 and/or 133 is deactivated when the measured duration reaches the maximum duration which is specific to that current limiter.

Of course, the present invention is not limited to the examples and embodiments described and illustrated but is capable of numerous variants accessible to the skilled person. In particular, the numerical values indicated above have been given by way of example only.

The invention claimed is:

1. An electronic connecting/disconnecting device for a high voltage unit for storing electrical energy designed to be charged and discharged asymmetrically, said unit for storing electrical energy being arranged within an electrical circuit, said device comprising a charging switch and a discharge switch arranged in parallel and dimensioned asymmetrically for charging and discharging said unit for storing electrical energy, said charging switch being adapted to block, in a first direction of passage, an electric current flowing therethrough, said first direction of passage being opposite to a second direction of passage in which said discharge switch is adapted to block an electric current passing therethrough, said device being designed to be activated when a physical magnitude of an electrical current flowing through said circuit is greater than a predetermined threshold.

2. The electronic device according to claim 1, wherein
the discharge switch is designed to manage short-circuit currents in said electrical circuit, and
the discharge switch and the charging switch are adapted to manage surge currents in said electrical circuit.

3. The electronic device according to claim 1, wherein each switch includes a power diode and a power transistor arranged in series.

4. The electronic device according to claim 3, wherein
the power diode is of the bipolar, Schottky or SiC type, and
the power transistor is of the bipolar, IGBT, MOSFET or JFET type.

5. The electronic device according to claim 1, wherein the charging switch is an electromechanical switch.

6. The electronic device according to claim 1, further comprising:
a sensor for measuring the at least one physical magnitude of electric current,
a control unit for comparing the at least one measured physical magnitude with the predetermined threshold, and
a drive circuit for controlling each switch.

7. The electronic device according to claim 6, wherein the drive circuit is electrically isolated from the at least one switch which it controls.

8. The electronic device according to claim 5, further comprising at least one current limiter comprising a transistor and a time delay control circuit.

9. An assembly comprising an electronic connecting/disconnecting device for a high voltage unit for storing electrical energy designed to be charged and discharged asymmetrically, said unit for storing electrical energy being arranged within an electrical circuit, said device comprising a charging switch and a discharge switch arranged in parallel and dimensioned asymmetrically for charging and discharging said unit for storing electrical energy, said charging switch being adapted to block, in a first direction of passage, an electric current flowing therethrough, said first direction of passage being opposite to a second direction of passage in which said discharge switch is adapted to block an electric current passing therethrough, said device being designed to be activated when a physical magnitude of an electrical current flowing through said circuit is greater than a predetermined threshold, and a unit for storing electrical energy at high voltage designed to be charged and discharged asymmetrically, said unit for storing electrical energy making up part of an electrical circuit, said unit for storing electrical energy being a battery made up of electrochemical storage cells and the voltage of which is greater than or equal to 250 volts.

10. A method for short-circuit current and surge current management in an electrical circuit using an electronic device according to claim 1, wherein said device is activated when a physical magnitude of an electrical current flowing through said circuit is greater than a predetermined threshold.

11. The method according to claim 10, wherein
an activation duration threshold for the electronic device is determined,
the electronic device is de-activated when a duration reaches said duration threshold.

12. The method of claim 10, wherein
the measured value of the physical magnitude is used to determine a time exceeded threshold,
an elapsed time from the moment when the predetermined threshold is reached by the measured physical magnitude is measured,
said measured elapsed time is compared with said threshold, and said electronic device is only activated when the measured elapsed time reaches said time exceeded threshold.

13. The method according to claim 10, further comprising:
determining a temperature threshold,
measuring a temperature near to or within the electrical circuit,
comparing said temperature measured with said temperature threshold, and
only activating the electronic device when said measured temperature exceeds said temperature threshold.

14. The method according to claim 10, further comprising:
determining a maximum duration of current limiter activity,
measuring a duration of activity of said current limiter
comparing said measured duration with said maximum duration, and
deactivating said current limiter when the measured duration reaches said maximum duration.

15. A method of manufacturing an electronic comprising an electronic connecting/disconnecting device for a high voltage unit for storing electrical energy designed to be charged and discharged asymmetrically, said unit for storing electrical energy being arranged within an electrical circuit, said device comprising a charging switch and a discharge switch arranged in parallel and dimensioned asymmetrically for charging and discharging said unit for storing electrical energy, said charging switch being adapted to block, in a first direction of passage, an electric current flowing therethrough, said first direction of passage being opposite to a second direction of passage in which said discharge switch is adapted to block an electric current passing therethrough, said device being designed to be activated when a physical magnitude of an electrical current flowing through said circuit is greater than a predetermined threshold, the method comprising:
determining at least one physical magnitude of an electrical current which each switch is designed to pass, and
independently dimensioning each switch according to said physical magnitude of the electric current it is designed to pass.

* * * * *